US011790653B2

United States Patent
Desai et al.

(10) Patent No.: US 11,790,653 B2
(45) Date of Patent: Oct. 17, 2023

(54) COMPUTER-GENERATED REALITY RECORDER

(71) Applicant: Apple Inc., Cupertino, CA (US)

(72) Inventors: Ranjit Desai, Cupertino, CA (US); Maneli Noorkami, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/016,127

(22) Filed: Sep. 9, 2020

(65) Prior Publication Data

US 2021/0073549 A1    Mar. 11, 2021

Related U.S. Application Data

(60) Provisional application No. 62/897,912, filed on Sep. 9, 2019.

(51) Int. Cl.
*G06T 15/00* (2011.01)
*G06V 20/40* (2022.01)
*H04N 9/87* (2006.01)
*G06T 19/00* (2011.01)
*G06T 17/20* (2006.01)

(52) U.S. Cl.
CPC ............. *G06V 20/42* (2022.01); *G06T 17/20* (2013.01); *G06T 19/006* (2013.01); *H04N 9/8715* (2013.01); *G06V 20/44* (2022.01)

(58) Field of Classification Search
CPC ......... G06T 19/00; G06T 17/20; G06T 17/00; G06T 15/10; G06T 15/00
USPC ........................................................ 345/419
See application file for complete search history.

(56) References Cited

U.S. PATENT DOCUMENTS

| | | | |
|---|---|---|---|
| 8,910,201 B1 | 12/2014 | Zamiska et al. | |
| 2009/0128549 A1* | 5/2009 | Gloudemans | G06T 15/20 345/419 |
| 2010/0046842 A1* | 2/2010 | Conwell | G06K 9/32 382/218 |
| 2012/0087561 A1* | 4/2012 | Guetter | G06T 7/174 382/131 |
| 2012/0147156 A1* | 6/2012 | Aizawa | H04N 13/144 348/51 |

(Continued)

FOREIGN PATENT DOCUMENTS

WO   WO 2018/217008   11/2018

OTHER PUBLICATIONS

International Search Report and Written Opinion from PCT/US2020/050001, dated Nov. 9, 2020, 17 pages.

(Continued)

*Primary Examiner* — Gordon G Liu
(74) *Attorney, Agent, or Firm* — BAKERHOSTETLER

(57) ABSTRACT

Implementations of the subject technology provides analyzing a recording of content. The subject technology generates metadata information based at least in part on the analyzing. The subject technology identifies, based at least in part on at least one of a user preference or a detected event, a region of interest or an object of interest in the recording of content. Based at least in part on the identified region of interest or object of interest, the subject technology generates a modified version of the recording of content. Further, the subject technology stores the modified version of the recording of content for subsequent playback on an electronic device.

24 Claims, 7 Drawing Sheets

(56) References Cited

U.S. PATENT DOCUMENTS

| | | |
|---|---|---|
| 2017/0337352 A1 | 11/2017 | Williams |
| 2017/0347039 A1 | 11/2017 | Baumert et al. |
| 2018/0173882 A1 | 6/2018 | Hamilton et al. |
| 2018/0190032 A1 | 7/2018 | Barnett et al. |
| 2018/0232471 A1* | 8/2018 | Schissler ................ G06K 9/627 |
| 2019/0019011 A1 | 1/2019 | Ross et al. |
| 2019/0156558 A1 | 5/2019 | Neeter |
| 2021/0073357 A1 | 3/2021 | Desai et al. |
| 2021/0103340 A1 | 4/2021 | Bradski et al. |

OTHER PUBLICATIONS

Indian Office Action from Indian Patent Application No. 202117060386 dated Aug. 28, 2023, 7 pages.

\* cited by examiner

COMPUTER-GENERATED REALITY RECORDER

CROSS REFERENCE TO RELATED APPLICATIONS

This application claims the benefit of priority to U.S. Provisional Patent Application No. 62/897,912, entitled "Computer-Generated Reality Recorder," filed on Sep. 9, 2019, the disclosure of which is hereby incorporated herein in its entirety.

TECHNICAL FIELD

The present description relates generally to computer-generated reality environments.

BACKGROUND

Augmented reality technology aims to bridge a gap between virtual environments and a physical environment by providing an enhanced physical environment that is augmented with electronic information. As a result, the electronic information appears to be part of the physical environment as perceived by a user. In an example, augmented reality technology further provides a user interface to interact with the electronic information that is overlaid in the enhanced physical environment.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
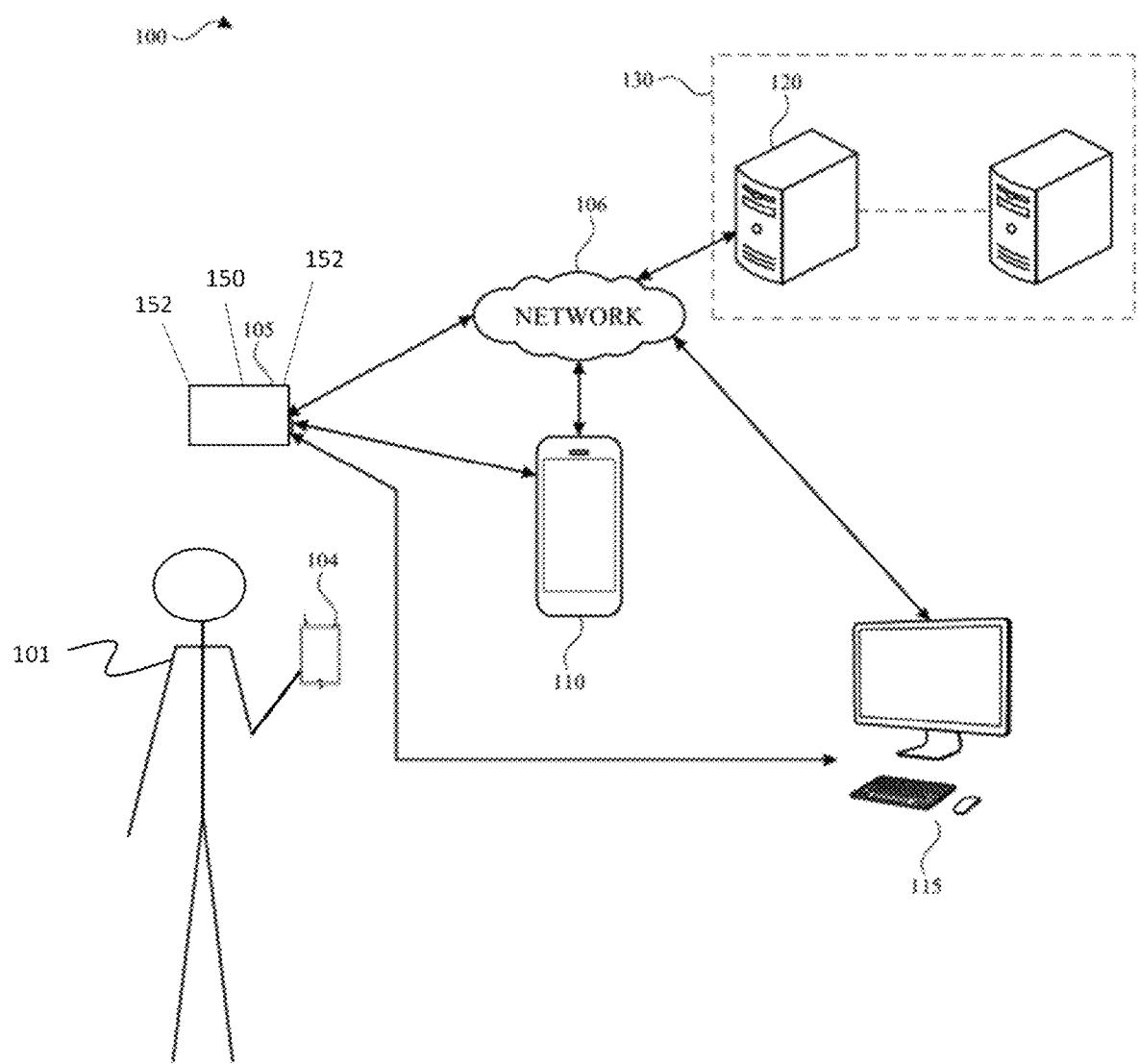
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A computer-generated reality (CGR) system enables physical and virtual environments to be combined in varying degrees to facilitate interactions from a user in a real-time manner. Such a CGR system, as described herein, therefore can include various possible combinations of physical and virtual environments, including augmented reality that primarily includes physical elements and is closer to a physical environment than a virtual environment (e.g., without physical elements). In this manner, a physical environment can be connected with a virtual environment by the CGR system. A user immersed in an CGR environment can navigate through such an environment and the CGR system can track the user's viewpoint to provide a visualization based on how the user is situated in the environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's body and/or head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and a virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over a portion of the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over a portion of the physical environment and/or behind a portion of the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include mobile devices, tablet devices, projection-based systems, heads-up displays (HUDs), head mounted systems, vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets or tablet devices, and desktop/laptop computers. For example, a head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide an CGR system that provides storage and management of computer-generated reality (CGR) recordings to facilitate editing and sharing of CGR content. In an example, a recording of CGR content can be analyzed to detect persons and/or objects that are of interest to a user. Based on the detected persons and/or objects, the subject system can generate information for use in generating a modified version of the CGR recording, which can also be generated based on user preferences. The subject system also can provide playback of CGR content (e.g., the modified CGR recording) and enable user input to determine playback behavior. Further, playback of CGR content may be determined based on user preferences.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 may be implemented, for example, as a tablet device, a handheld and/or mobile device, or as a head mounted portable system (e.g., worn by a user 101). The electronic device 105 includes a display system capable of presenting a visualization of a computer-generated reality environment to the user. The electronic device 105 may be powered with a battery and/or another power supply. In an example, the display system of the electronic device 105 provides a stereoscopic presentation of the computer-generated reality environment, enabling a three-dimensional visual display of a rendering of a particular scene, to the user. In one or more implementations, instead of, or in addition to, utilizing the electronic device 105 to access a computer-generated reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User input detected by such sensors and/or hardware elements correspond to, for example, various input modalities for initiating a co-presence session from within an application. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

In one or more implementations, the electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the computer-generated reality environment may be offloaded to the base device thereby reducing processing burdens on the electronic device 105. For instance, in an implementation, the electronic device 105 works in conjunction with the electronic device 110 or the electronic device 115 to generate a computer-generated reality environment including physical and/or virtual objects that enables different forms of interaction (e.g., visual, auditory, and/or physical or tactile interaction) between the user and the generated computer-generated reality environment in a real-time manner. In an example, the electronic device 105 provides a rendering of a scene corresponding to the computer-generated reality environment that can be perceived by the user and interacted with in a real-time manner, such as a host environment for a co-presence session with another user. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the computer-generated reality environment. Examples of such events include detecting a presence of a particular person, entity, or object in the scene. In response to the detected event, the electronic device 105 can provide annotations (e.g., in the form of metadata) in the computer-generated reality environment corresponding to the detected event.

In an implementation, the electronic device 105 generates a recording of a physical environment and generates a computer-generated reality environment including two-dimensional (2D) video for sharing and playback. In another implementation, the electronic device 105 generates a recording, and subsequently generates a three-dimensional (3D) representation merging information from all sensors and/or combining recording with other users' recordings (e.g., different point of views (POVs) and/or different fields of view (FOVs)). It is further appreciated that the electronic device 110 and/or the electronic device 115 can also generate such computer-generated reality environments either working in conjunction with the electronic device 105 or independently of the electronic device 105.

The network 106 may communicatively (directly or indirectly) couple, for example, the electronic device 104, the electronic device 105, the electronic device 110, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a computer-generated reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic device discussed below with respect to the electronic system discussed below with respect to FIG. 7. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 7.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for computer-generated reality environments. In an implementation, the server 120 may function as a cloud storage server that stores any of the aforementioned computer-generated reality content generated by the above-discussed devices and/or the server 120.

In an implementation, the server 120 may provide a secure environment corresponding to a secure cloud environment discussed further below for analyzing a recording of CGR content. Such a recording may be provided by at least one of the electronic device 105, the electronic device 110, and/or the electronic device 115. Similarly, the electronic device 105, the electronic device 110, and/or the electronic device may also provide a secure environment for analyzing a recording of CGR content as discussed further below in FIG. 2.

Figure 2:
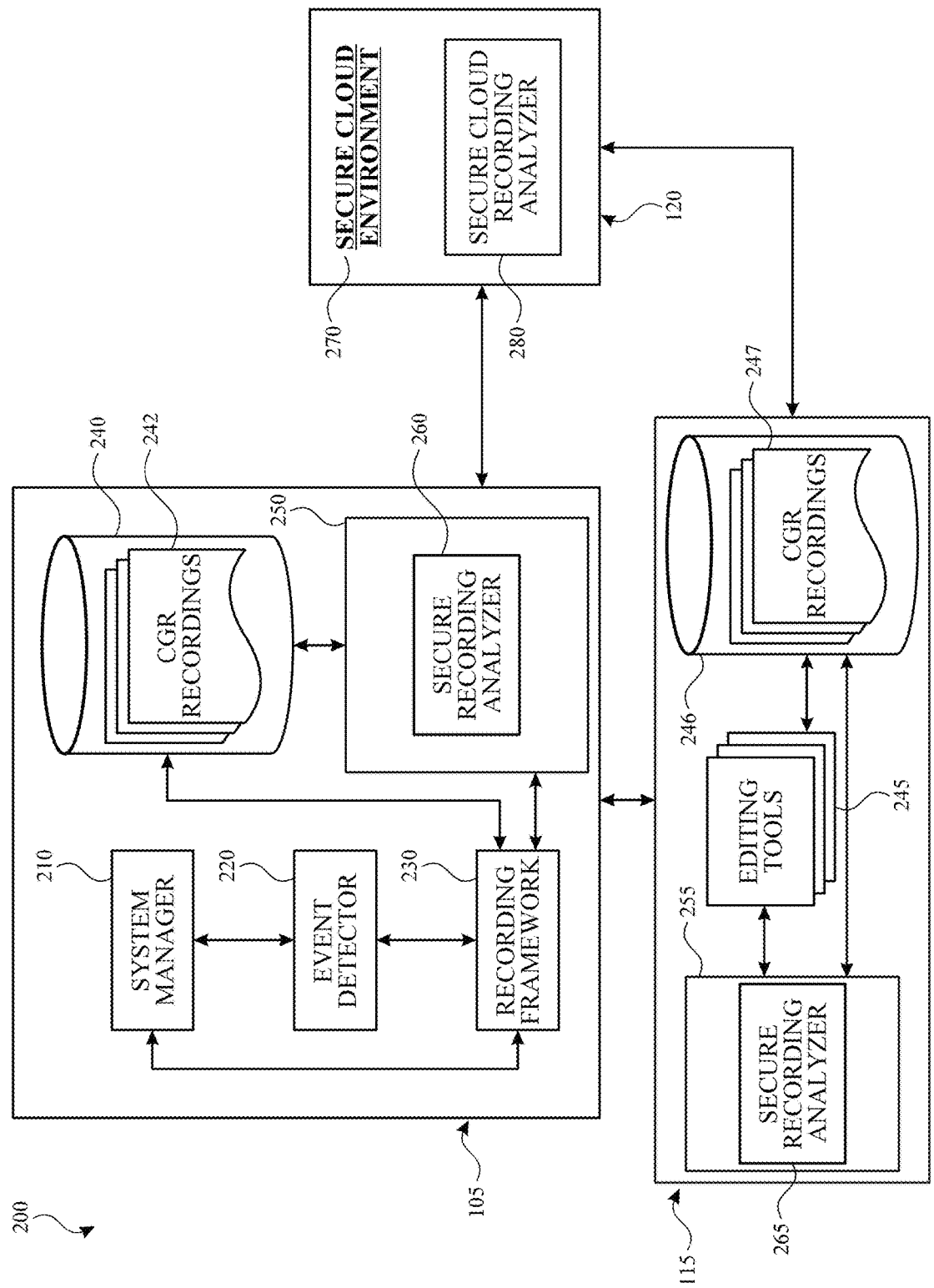
FIG. 2 illustrates an example software architecture that may be implemented on an electronic device and/or a server in accordance with one or more implementations of the subject technology.

FIG. 2 illustrates an example software architecture 200 that may be implemented on the electronic device 105, the electronic device 115, and/or the server 120 in accordance with one or more implementations of the subject technology. For explanatory purposes, the software architecture 200 is described as being implemented by the electronic device 105, the electronic device 115, and the server 120 of FIG. 1, such as by a processor and/or memory of the electronic device 105, electronic device 115, and the server 120; however, appropriate portions of the software architecture 200 may be implemented by any other electronic device, including the electronic device 110. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The software architecture 200, as implemented on the electronic device 105, includes a framework. A framework, as used herein, can refer to a software environment that provides particular functionality as part of a larger software platform to facilitate development of software applications, and may provide one or more application programming interfaces (APIs) that may be utilized by developers to design, in a programmatic manner, computer-generated reality environments and to handle operations for such computer-generated reality environments.

As illustrated, a recording framework 230 is provided. The recording framework 230 may provide functionality to record a computer-generated reality environment provided by the input modalities as discussed above. An event detector 220 is provided that receives information corresponding to input from the various input modalities. A system manager 210 is provided to monitor resources from the electronic device 105 and determine a quality of service metric based on available resources. The system manager 210 can make decisions for selecting particular hardware components, corresponding to respective input modalities, to activate and/or deactivate in view of the quality of service metric. For example, a camera that tracks facial expressions can be turned off, or another camera that tracks hand gestures can be turned off. When particular hardware is deactivated, the electronic device 105 may provide a notification to alert the user that a particular input modality is unavailable. Similarly, the electronic device 105 may provide a notification to alert the user that a particular input modality is available upon activating particular hardware.

In an implementation, the software architecture 200 enables managing CGR recordings by providing a repository or storage location to upload such recordings. As illustrated in FIG. 2, the electronic device 105 includes a database 240 for storing CGR recordings 242, which may be provided by the recording framework 230 and/or a secure environment 250 discussed further below. The recording framework 230, in an example, may generate a CGR recording and encrypt such a recording for storing in the database 240.

As further shown, the electronic device 105 includes a secure environment 250. A secure environment, as used herein, provides a secure computing environment that is isolated from other processes executing on a given processor of a particular device (e.g., the electronic device 105) where the secure environment is inaccessible to both the processor executing the other processes and the other processes themselves. Further, the secure environment encrypts any portion of memory that it utilizes and may utilize a separate processor (e.g., a custom security-oriented processor) than the processor that is executing such other processes (e.g., on the electronic device 105). The secure environment may also use homomorphic encryption when processing a given CGR recording. Additionally, the secure environment may be enabled to decrypt encrypted CGR recordings stored in any one of the electronic devices shown in FIG. 1.

Implementations of the software architecture 200, and components thereof, enable the automatic segmenting of CGR recordings based on content and annotations which also enables the recordings to be searchable. Further, the software architecture 200, and components thereof, enables recommendations to other recordings to be provided based at least in part on a topic and/or interest of a user, which may be provided in a user preference stored in an associated user profile. The software architecture 200, and components thereof, enable multiple recordings to be generated based on recommendations or based on user preferences, and also enable random browsing of recordings (pause, playback, seek, etc.)

In an example, the secure environment 250 may receive a given CGR recording from the recording framework 230, or receive a request from the recording framework 230 to retrieve the CGR recording stored in the database 240. As illustrated, the secure environment 250 includes a secure recording analyzer 260 that analyzes recordings and generates metadata and/or annotations based on the analysis. The secure recording analyzer 260, in an implementation, can execute specific classifiers for object detection, and determine motion vectors of objects if such objects are moving during the recording. In an example, such motion vectors may be utilized to track objects and/or predict where the objects may be moving toward. The secure recording analyzer 260 provides annotations of the recording (e.g., tagged with metadata information) to objects and to detected events and/or recognized persons. In another example, the secure recording analyzer 260 determines acoustic information about a person or object from speech, voices, and/or audio which may be used for movement or location tracking and/or recognition of the person or object. Further, the analysis can also be tailored depending on type of recording (e.g., sports, particular location such as the beach, etc.) to target specific events or objects that are likely to be present in the type of recording.

As also shown, the server 120 provides a secure cloud environment 270, which corresponds to a particular type of secure environment in an implementation. For instance, the secure cloud environment 270 supports a set of processor instruction codes that enables user-level code to allocate private regions of memory (e.g., enclaves) that are protected and isolated from other processes. The secure cloud environment 270 may use its own set of processors (e.g., CPU and/or GPU). In an implementation, the server 120 includes a secure cloud recording analyzer 280 which performs the same or similar functionality to the secure recording analyzer 260 discussed above on a given CGR recording. In one example, the server 120 may receive a request from the electronic device 105 to perform an analysis of a given CGR recording. The results of any analysis (e.g., generated metadata information or recommendations) performed by the secure recording analyzer 260 can be returned to the electronic device 105 for further processing.

In an implementation, the electronic device 115 includes a secure environment 255 with a secure recording analyzer 265, each of which may respectively perform the same functionality as described above in connection with the secure environment 250 and the secure recording analyzer 260 of the electronic device 105. For example, the secure recording analyzer 260 may analyze a CGR recording from one of the CGR recordings 247 stored in a database 246.

As illustrated, the electronic device 115 includes a set of tools 245 that correspond to various editing tools (e.g., specific applications) that provide editing functionality to modify CGR recordings. Each editing tool may be capable of receiving a CGR recording (e.g., corresponding to one of the CGR recordings 247 stored in a database 246) for editing. Examples of an editing tool include an image editor, a tool for 3D composition, and/or a multimedia editor that enables organization of CGR content along a timeline. A given editing tool may also enable insertion of new objects or content into a scene, including new virtual content.

Although not illustrated in FIG. 2, it is appreciated that the electronic device 110 may also include similar components as those discussed in connection with the electronic device 115 above.

The following discussions in FIGS. 3A, 3B, 3C, 4A, 4B, 4C, 5A, 5B, and 5C relate to examples of analyzing various computer-generated reality recordings, including detection of objects and persons and generating annotations for incorporating into modified recordings for playback.

Figure 3A:
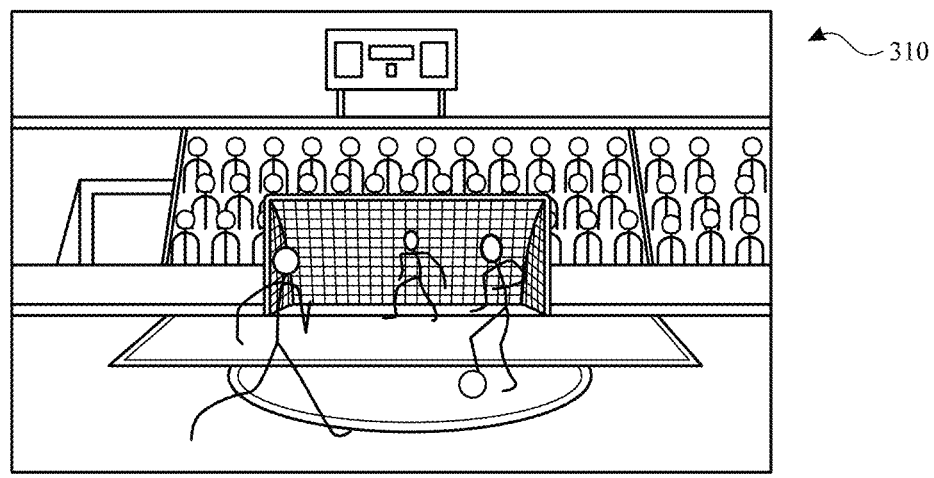
FIGS. 3A, 3B, and 3C illustrate examples of analyzing a computer-generated reality recording in accordance with implementations of the subject technology.
Figure 3B:
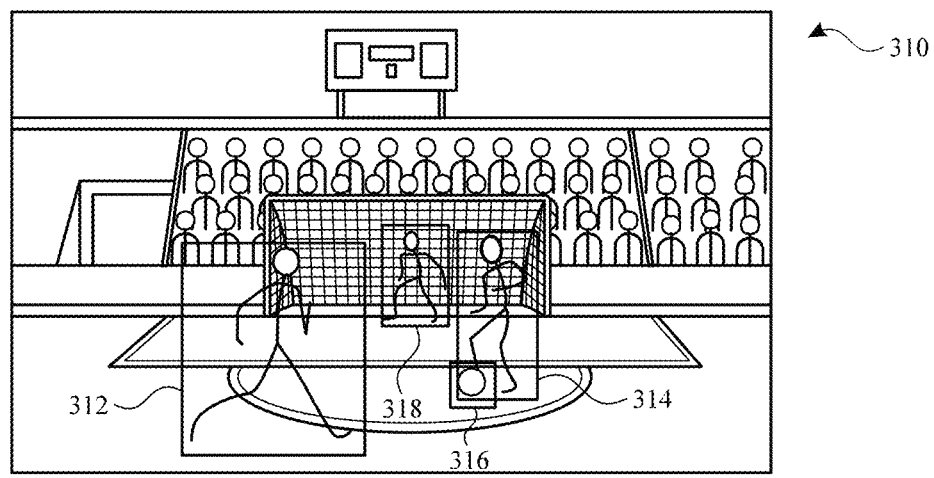
Figure 3C:
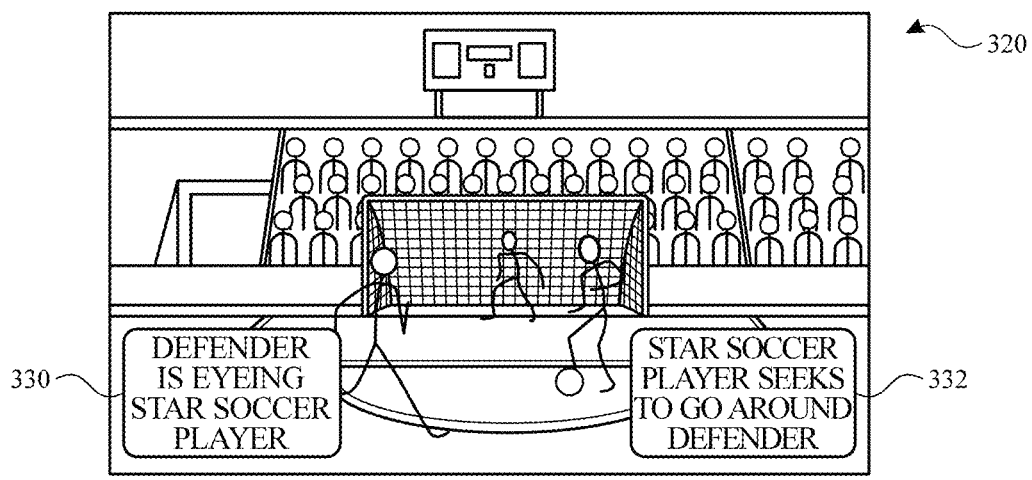

FIGS. 3A, 3B, and 3C illustrate examples of analyzing a computer-generated reality recording in accordance with implementations of the subject technology. The following discussion relates to components of the software architecture 200 in FIG. 2.

As illustrated in FIG. 3A, a scene 310 shows a sporting event (e.g., soccer game) that is included in a computer-generated reality (CGR) recording. In the scene 310, various objects corresponding with three soccer players on a playing field are present with a crowd of spectators in the background.

In FIG. 3B, a secure recording analyzer (e.g., the secure recording analyzer 260 or 265, or the secure cloud recording analyzer 280) analyzes the scene 310 and detects the presence of a person 312 (e.g., a soccer player without the soccer ball), a person 314 (e.g., a soccer player in close proximity to a soccer ball), a soccer ball 316, and a person 318 (e.g., a goalie). In response, the secure recording analyzer may generate associated metadata information corresponding to the detected person(s).

In an implementation, the secure recording analyzer detects an object in the scene 310 based at least in part on running an object classifier in the CGR recording, and recognizes the object using at least a database of objects, which can include information to identify the object (e.g., in the case of a person or other entity, or to further provide contextual information related to the object). The secure recording analyzer may use multiple attributes of the object for identification of the object, including available metadata information, shape, physical attributes, audio/sound, etc. In this example, the person 314 may be recognized as a particular star soccer player and information may be generated to indicate this particular star soccer player. In this manner, associated metadata information to the object is generated based at least in part on recognizing the object. As discussed above, as the scene 310 relates to a type of sporting event, the analysis of the secure recording analyzer may be tailored to better analyze the sporting event (e.g., detecting players, detecting the path of the ball, detecting particular events that may occur during the match, etc.). Using the associated metadata information, the recording framework 230 or editing tool can generate a modified version of the CGR recording.

In FIG. 3C, a scene 320, which corresponds to a modified version of the scene 310, may have been generated (e.g., by a particular editing tool or host application, or the recording framework 230) based at least in part on information generated from the above-discussed analysis of the CGR recording. In the scene 320, an annotation 330 and an annotation 332 are provided corresponding to the recognized star soccer player (e.g., the person 314) and the person 312. Such annotations may be presented to a user during playback of the modified version of the CGR recording to further enhance the experience of the CGR environment. In one or more implementations, the annotations may be stored in association with the corresponding objects and may be subsequently used to identify the corresponding objects in the CGR recording.

Figure 4A:
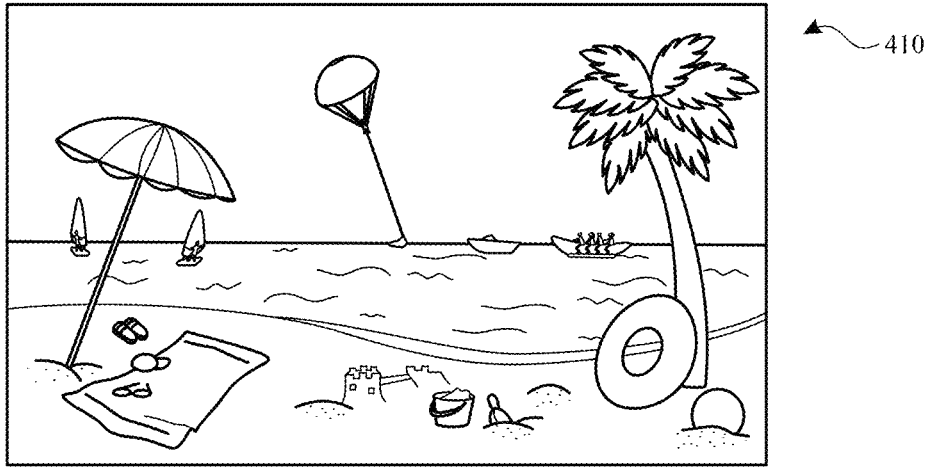
FIGS. 4A, 4B, and 4C illustrate examples of analyzing a computer-generated reality recording in accordance with implementations of the subject technology.
Figure 4B:
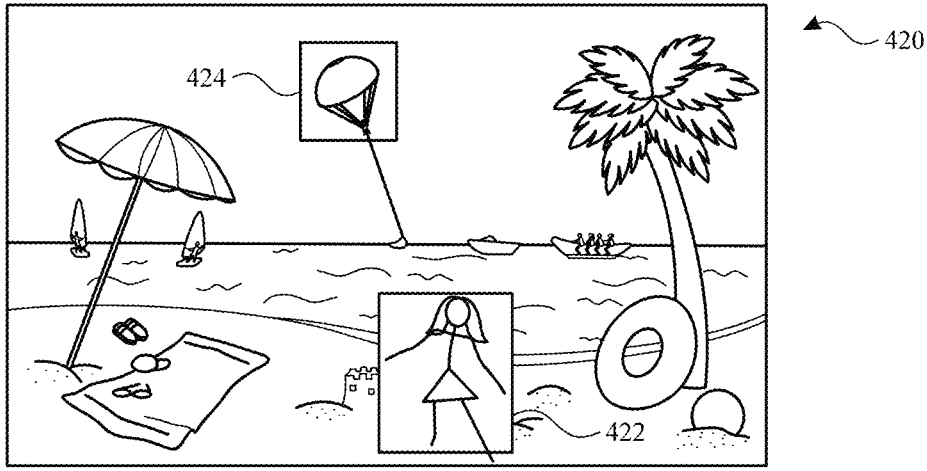
Figure 4C:
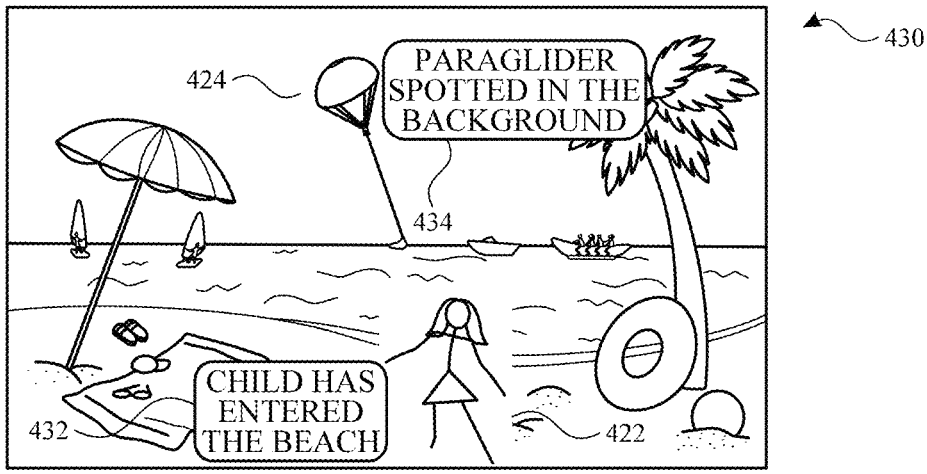

FIGS. 4A, 4B, and 4C illustrate examples of analyzing a computer-generated reality recording in accordance with implementations of the subject technology. The following discussion relates to components of the software architecture 200 of FIG. 2.

As illustrated in FIG. 4A, a scene 410 shows a particular outdoor environment (e.g., beach) that is included in a computer-generated reality (CGR) recording. In the scene 410, various objects corresponding to particular items on a beach are present with other various objects in the background corresponding to a particular body of water (e.g., ocean).

In FIG. 4B, a scene 420, which is included in the computer-generated reality (CGR) recording and subsequent in time to the scene 410, shows a presence of a person that was not present in the scene 410. A secure recording analyzer (e.g., the secure recording analyzer 260 or 265, or the secure cloud recording analyzer 280) analyzes the scene 420 and detects an event corresponding to a new presence of a person 422 (e.g., a child). In response, the secure recording analyzer may generate associated metadata information corresponding to the detected event (e.g., the presence of the person 422). In this example, the person 422 may be further recognized as a particular person of interest (e.g., a family member) based on a user preference (e.g., annotate when a family member enters into the CGR recording) and information may be generated to indicate the event related to the family member. In another example, the secure recording analyzer can detect anomalies related to people and/or events in a scene and generate corresponding metadata as annotations to the scene. Such anomalies can also be detected based on a user preference (e.g., annotate when a particular event occurs such as detection of when a baby starts crying).

Additionally, the secure recording analyzer analyzes the scene 420 and detects an object 424 corresponding to a paraglider in the background of the scene 420. In an example, a user preference may indicate that the user is interested in paragliders (e.g., user wishes to highlight any object detected as a paraglider in the beach outdoor environment). The secure recording analyzer may generate associated metadata information corresponding to the detected object (e.g., the presence of the paraglider).

Using the associated metadata information, the recording framework 230 or editing tool can generate a modified version of the CGR recording. In FIG. 4C, a scene 430, which corresponds to a modified version of the scene 420, may have been generated (e.g., by a particular editing tool or host application, or the recording framework 230) based at least in part on information generated from the above-discussed analysis of the CGR recording. In the scene 430, an annotation 432 and an annotation 434 are provided corresponding to the recognized family member (e.g., the person 422) and the detected object 424 (e.g., the paraglider). Such annotations may be presented to a user during playback of the modified version of the CGR recording to further enhance the experience of the CGR environment and to indicate detected events and/or objects.

Figure 5A:
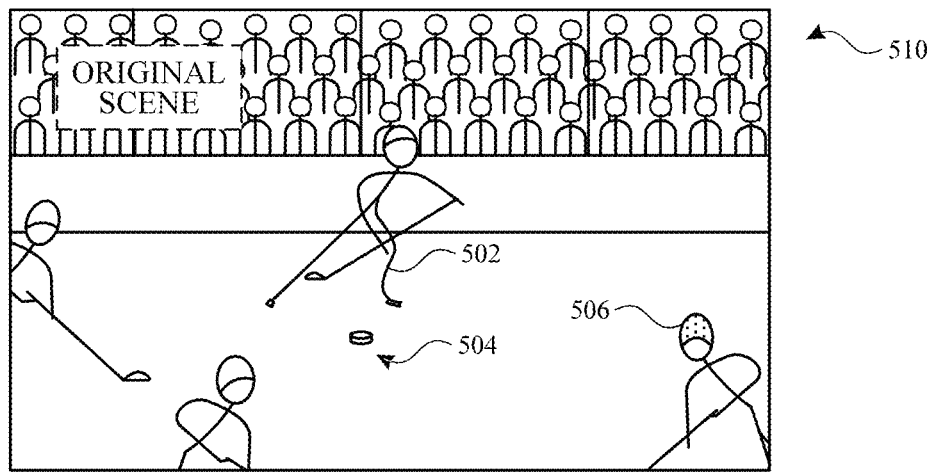
FIGS. 5A, 5B, and 5C illustrate examples of analyzing a computer-generated reality recording and providing playback of the computer-generated reality recording based on the analysis in accordance with implementations of the subject technology.
Figure 5B:
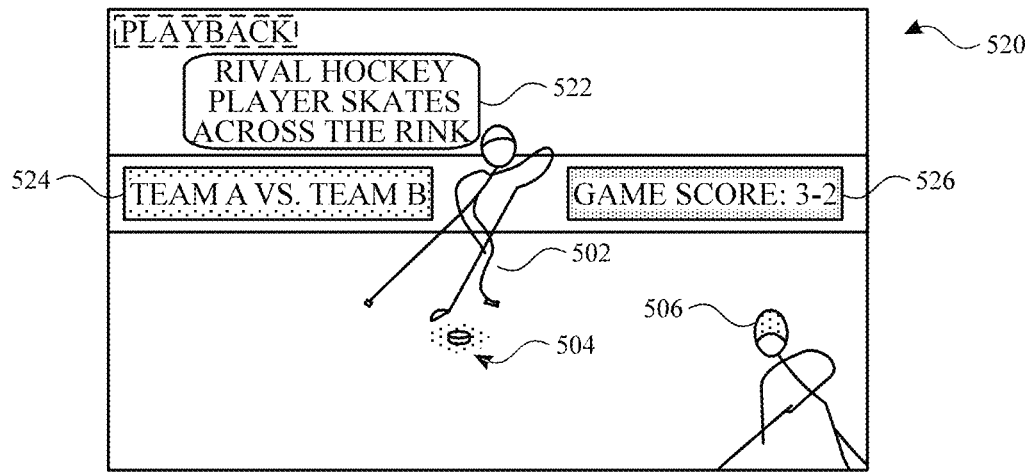
Figure 5C:
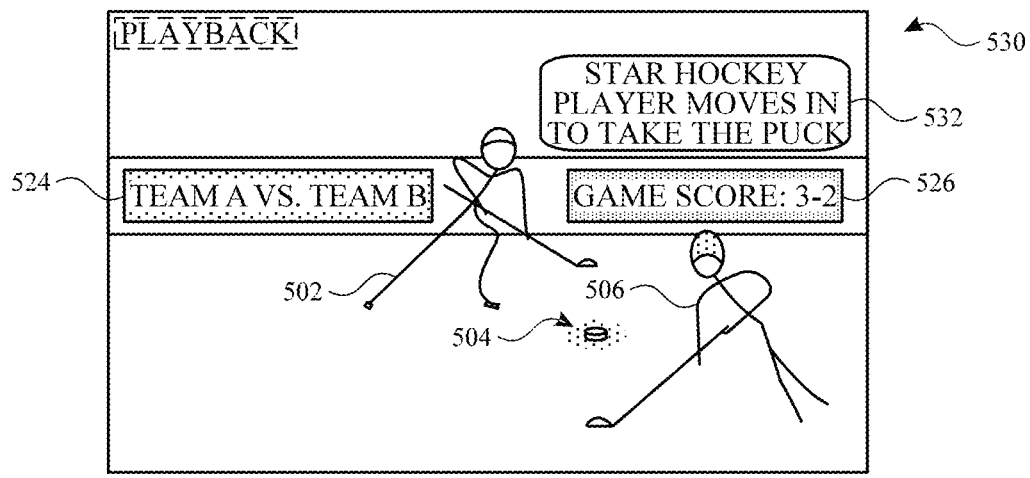

FIGS. 5A, 5B, and 5C illustrate examples of analyzing a computer-generated reality recording and providing playback of the computer-generated reality recording based on the analysis in accordance with implementations of the subject technology. The following discussion relates to components of the software architecture 200 in FIG. 2.

As illustrated in FIG. 5A, a scene 510 shows a sporting event (e.g., hockey game) that is occurring in a computer-generated reality recording. Spectators are in the background of the scene 510 and hockey players are shown on an ice rink in the foreground of the scene 510. A secure recording analyzer (e.g., the secure recording analyzer 260 or 265, or the secure cloud recording analyzer 280) analyzes the scene 510 and detects an object 504 corresponding to a hockey puck. Further, in this example, the user has selected a region of interest corresponding to the object 504, which may be used for focusing on the object 504 during playback as discussed further below.

The secure recording analyzer has detected and recognized a presence of a particular person 506 (e.g., a star hockey player) in FIG. 5A, and a presence of a person 502 (e.g., rival hockey player). The secure recording analyzer may generate associated metadata information corresponding to the aforementioned objects or persons. In this example, the secure recording analyzer detects a presence of a moving person (e.g., the hockey players) or moving object (e.g., the hockey puck) in the recording, and determines a motion vector of the moving person(s) or moving object(s). Using the associated metadata information, the recording framework 230 or editing tool can generate a modified version of the CGR recording. In an example, the recording framework 230 or editing tool can generate a three-dimensional (3D) mesh of at least one of the recognized objects in the recording where the modified CGR recording is based on a 3D representation of the recording including a rendering of the 3D mesh of the at least one of the recognized objects. In another example, an acoustic mesh may be generated based on an analysis of audio content (e.g., speech, voices, audio) from a scene, which may be used to recognize objects or persons in the CGR recording and/or determining locations of such objects or persons and any movements thereof within a scene from the recording.

In some implementations, during playback of a given modified CGR recording, navigation to certain events based on generated metadata/annotations is enabled, along with interactions with objects. Playback from different POVs may also be provided if multiple recordings of the same environment are available. Annotations may be presented during playback and based on what is happening in the scene. Moreover, the user can identify objects of interest during playback, and a type of rendition of playback can be determined based on user preferences (e.g., path of the ball, focus on a particular person of interest, etc.). During playback, the user can indicate a region of interest or a region of interest may be inferred (e.g., person entering the scene). Further, it is appreciated that playback of the modified CGR recording is not constrained by time (e.g., as in a typical playback of a recording without CGR components) and may be according to user playback and order. Based on user preferences, the playback can focus on a certain individual and/or focus on something that is considered important in the scene. Playback can further prioritize a type of modality, depend on certain events (e.g., glass breaking, particular person in a scene) and/or prioritize playback on devices that have better capabilities.

FIGS. 5B and 5C relate to different scenes during playback of the modified CGR recording. In FIG. 5B, a scene 520 shows a modified presentation of the same hockey game in the scene 510. For example, based on user preferences, the scene 520 focuses on the particular person 506, the person 502, and the region of interest corresponding to the hockey puck (e.g., the object 504). In this example, a 3D representation, based on a 3D mesh, of the hockey puck may be presented to the user during playback to better highlight the object 504 and enhance the user experience of viewing the modified CGR recording. Moreover, the spectators in the background of the scene 510 have been blurred out (or removed) in the scene 520, along with other hockey players that were also present in the scene 510. Further, the particular person 506 has been rendered in the scene 520 in a different manner to better highlight the star hockey player's actions in the scene 520. New digital content, corresponding to digital objects 524 and 526, has also been inserted into the scene 520 to provide contextual information related to the hockey game. The scene 520 includes an annotation 522 that describes an event occurring in the scene 520.

In FIG. 5C, a scene 530 shows that the particular person 506 moves to a different position than in the scene 520 and is fully in a frame of view of the scene 530. The scene 530 includes an annotation 532 that describes a detected event occurring in the scene 530.

Figure 6:
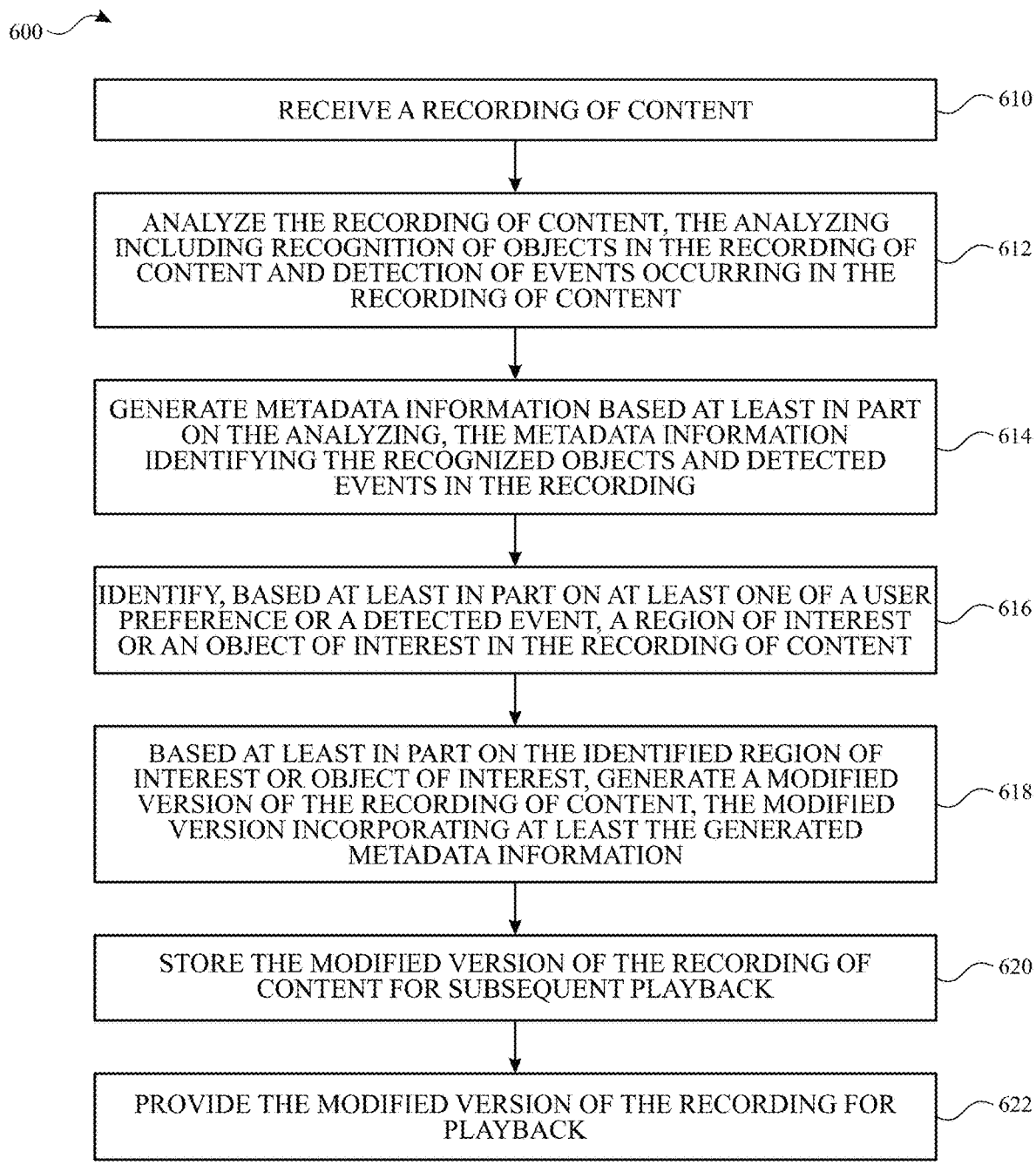
FIG. 6 illustrates a flow diagram of an example process for analyzing a recording of computer-generated reality content in accordance with implementations of the subject technology.

FIG. 6 illustrates a flow diagram of an example process 600 for analyzing a recording of computer-generated reality content in accordance with implementations of the subject technology. For explanatory purposes, the process 600 is primarily described herein with reference to the electronic device 105 of FIGS. 1 and 2. However, the process 600 is not limited to the electronic device 105 of FIGS. 1 and 2, and one or more blocks (or operations) of the process 600 may be performed by one or more other components of other suitable devices, including the electronic device 105, the electronic device 110, and/or the server 120. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As illustrated in FIG. 6, the electronic device 105 receives a recording of content (610). The electronic device 105 analyzes the recording of content where the analyzing includes recognition of objects in the recording of content and detection of events occurring in the recording of content (612). The electronic device 105 generates metadata information based at least in part on the analyzing, the metadata information identifying the recognized objects and detected events in the recording (614). The electronic device 105 identifies, based at least in part on at least one of a user preference or a detected event, a region of interest or an object of interest in the recording of content (616). The electronic device 105, based at least in part on the identified region of interest or object of interest, generates a modified version of the recording of content, the modified version incorporating at least the generated metadata information (618). The electronic device 105 stores the modified version of the recording of content for subsequent playback, e.g., in conjunction with the generated metadata (620). The electronic device 105 provides the modified version of the recording for playback (622).

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 7:
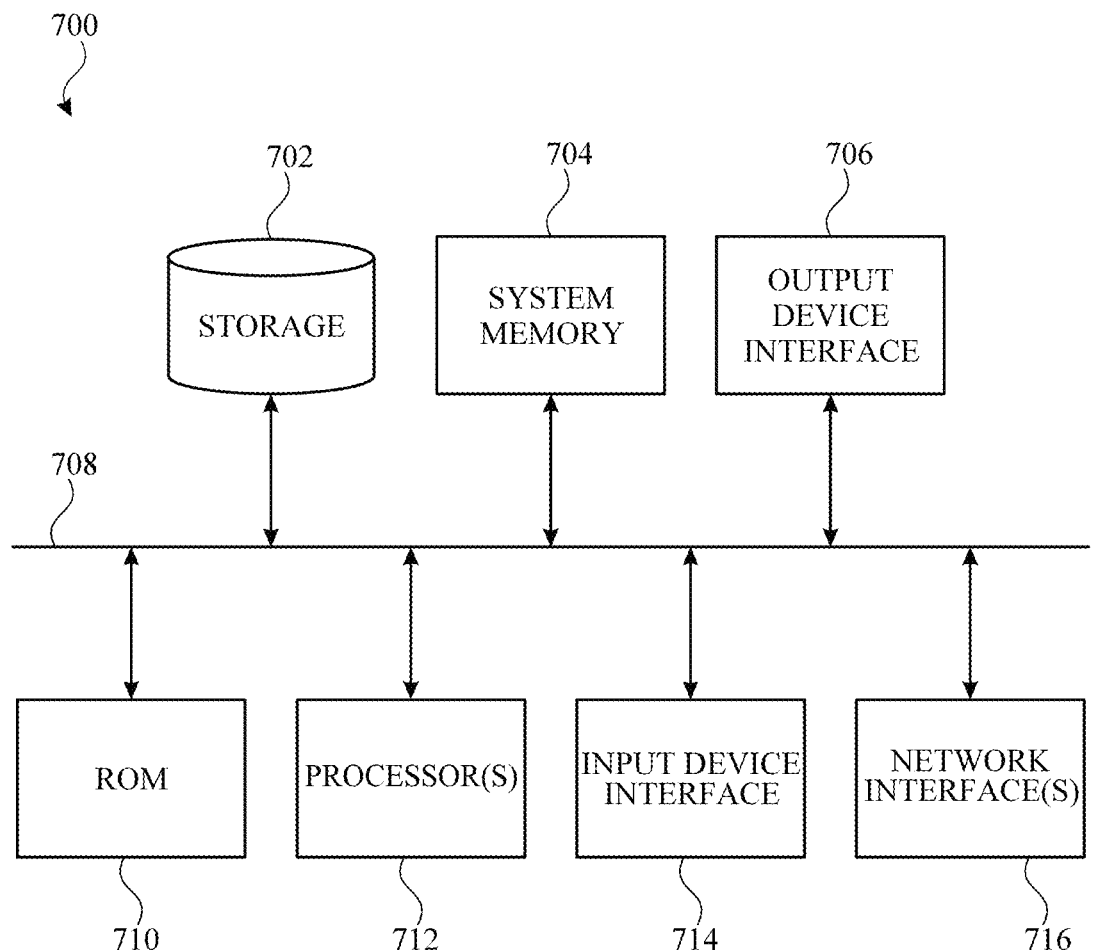
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of, the electronic device 105, the electronic device 104, the electronic device 110, the electronic device 115, and/or the server 120 as shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 110 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method comprising:
receiving a recording of content, the recording having been captured by an electronic device;
analyzing the recording of content, the analyzing including recognition of objects in the recording of content and detection of events occurring in the recording of content;
generating metadata information based at least in part on the analyzing, the metadata information identifying the recognized objects and detected events in the recording;
identifying, based at least in part on at least one of a user preference or a detected event, a region of interest or an object of interest in the recording of content;
based at least in part on the identified region of interest or object of interest, generating a modified version of the recording of content, the modified version incorporating at least the generated metadata information, the generating comprising blurring at least a portion of the recording based on identified content of the recording; and
storing the modified version of the recording of content for subsequent playback on the electronic device.

2. The method of claim 1, further comprising:
providing the modified version of the recording to the electronic device for playback.

3. The method of claim 2, wherein playback of the modified version of the recording is based at least in part on focusing on the region of interest, and replacing at least one detected object in the region of interest with a three-dimensional virtual representation of the object.

4. The method of claim 1, wherein analyzing the recording of content further comprises:
detecting an object based at least in part on running an object classifier on the recording; and
recognizing the object using at least a database of objects, the database of objects including information to identify the object using multiple attributes of the object.

5. The method of claim 4, further comprising:
generating an associated annotation for the object based at least in part on recognizing the object, the annotation being presented during playback of the modified version of the recording when the object is displayed.

6. The method of claim 1, wherein analyzing the recording of content further comprises:
detecting a presence of a moving person or a moving object in the recording;
determining a motion vector of the moving person or the moving object; and
determining acoustic information corresponding to the moving person or the moving object from at least one of speech, voice, or audio.

7. The method of claim 1, wherein generating the modified version of the recording of content further comprises:
generating a three-dimensional (3D) mesh of at least one of the recognized objects in the recording;
generating a 3D representation of the recording of content, the 3D representation including a rendering of the 3D mesh of the at least one of the recognized objects; and
generating an acoustic mesh of a scene based on acoustic information.

8. The method of claim 1, wherein identifying, based at least in part on at least one of the user preference or the detected event, the region of interest further comprises:
detecting a presence of a particular person in the recording;
determining the particular person is indicated as a person of interest based at least in part on the user preference;
detecting an anomaly related to the particular person or the detected event in the recording; and
generating metadata corresponding to the detected anomaly.

9. The method of claim 1, wherein identifying, based at least in part on at least one of the user preference or the detected event, the region of interest further comprises:
detecting a presence of a particular object in the recording; and
determining the particular object is indicated as an object of interest based at least in part on the user preference.

10. The method of claim 1, wherein analyzing the recording of content is provided in a secure environment, the secure environment isolated from other executing processes.

11. The method of claim 1, further comprising:
detecting a presence of a particular person in the recording, wherein the blurring comprising blurring at least a portion of the detected particular person.

12. The method of claim 11, further comprising:
determining the particular person is indicated as a person of interest based at least in part on the user preference.

13. The method of claim 11, wherein the blurred at least the portion of the detected particular person comprises a personally identifying portion of the detected particular person.

14. The method of claim 1, wherein the blurring the at least the portion of the recording comprises blurring a portion of the recording outside of the identified region of interest or object of interest.

15. A system comprising:
a processor;
a memory device containing instructions, which when executed by the processor cause the processor to perform operations comprising:
receiving a recording of content, the recording having been captured by an electronic device;

analyzing the recording of content, the analyzing including recognition of objects in the recording of content and detection of events occurring in the recording of content;

generating metadata information based at least in part on the analyzing, the metadata information identifying the recognized objects and detected events in the recording;

identifying, based at least in part on at least one of a user preference or a detected event, a region of interest or an object of interest in the recording of content;

based at least in part on the identified region of interest or object of interest, generating a modified version of the recording of content, the modified version incorporating at least the generated metadata information, the generating comprising blurring a determined background portion of the recording; and storing the modified version of the recording of content for subsequent playback on the electronic device.

16. The system of claim 15, wherein the memory device contains further instructions, which when executed by the processor further cause the processor to perform further operations comprising:

providing the modified version of the recording to the electronic device for playback.

17. The system of claim 15, wherein analyzing the recording of contents causes the processor to perform further operations comprising:

detecting an object based at least in part on running an object classifier in the recording; and recognizing the object using at least a database of objects, the database of object including information to identify the object using multiple attributes of the object.

18. The system of claim 17, wherein the memory device contains further instructions, which when executed by the processor further cause the processor to perform further operations comprising:

generating associated metadata information to the object based at least in part on recognizing the object.

19. The system of claim 15, wherein analyzing the recording of content causes the processor to perform further operations comprising:

detecting a presence of a moving person or a moving object in the recording; and determining a motion vector of the moving person or the moving object.

20. The system of claim 15, wherein generating the modified version of the recording of content causes the processor to perform further operations comprising:

generating a three-dimensional (3D) mesh of at least one of the recognized objects in the recording;

generating a 3D representation of the recording of content, the 3D representation including a rendering of the 3D mesh of the at least one of the recognized objects;

determining acoustic information from speech, voices, or audio of the recording; and generating an acoustic mesh of a scene of the recording based at least in part on the acoustic information.

21. The system of claim 15, wherein identifying, based at least in part on at least one of the user preference or the detected event, the region of interest causes the processor to perform further operations further comprising:

detecting a presence of a particular person in the recording;

determining the particular person is indicated as a person of interest based at least in part on the user preference;

detecting an anomaly related to the particular person or detected event in the recording; and generating metadata corresponding to the detected anomaly.

22. The system of claim 15, wherein identifying, based at least in part on at least one of the user preference or the detected event, the region of interest causes the processor to perform further operations further comprising:

detecting a presence of a particular object in the recording; and determining the particular object is indicated as an object of interest based at least in part on the user preference.

23. The system of claim 15, wherein at least one of the detected events corresponds to motion of at least one of the recognized objects in the recording of content.

24. A non-transitory computer-readable medium comprising instructions, which when executed by a computing device, cause the computing device to perform operations comprising:

receiving a recording of content, the recording having been captured by an electronic device;

analyzing the recording of content, the analyzing including recognition of objects in the recording of content and detection of events occurring in the recording of content;

generating metadata information based at least in part on the analyzing, the metadata information identifying the recognized objects and detected events in the recording;

identifying, based at least in part on at least one of a user preference or a detected event, a region of interest or an object of interest in the recording of content;

based at least in part on the identified region of interest or object of interest, generating a modified version of the recording of content, the modified version incorporating at least the generated metadata information, the generating comprising blurring a determined portion of the recording; and storing the modified version of the recording of content for subsequent playback on the electronic device.

* * * * *